Patented July 26, 1938

2,124,951

UNITED STATES PATENT OFFICE 2,124,951

METHOD OF CONCENTRATING SERUM

George Watson Little and Abraham J. Klein, New York, N. Y.; said Klein assignor to said Little No Drawing. Application November 16, 1935, Serial No. 50,154

7 Claims. (Cl. 167—78)

This invention relates to serum concentration and has for its object an improved method of concentrating serum of virus origin derived from and used in the treatment of animals. More particularly, the invention contemplates an improved method of producing a clear serum containing a relatively high percentage of solids without appreciable loss of anti-virus.

The invention aims to treat blood from hyper-immunized animals, preferably animals which had been injected intravenously or otherwise with the living virus of a virus disease such as distemper in dogs, hog cholera in hogs, encephalomyelitis in horses, and infectious enteritis in cats. In accordance with the invention, serum is separated from the blood as by centrifuging and is subjected to a series of operations or steps comprising a control of the hydrogen ion concentration (pH) of the serum to effect a high precipitation of objectionable matter (fibrin and inert or acid proteins). The serum is treated with a salt solution under acid conditions of controlled pH, the soluble salts or ionizable material is removed either by dialysis or by electrolysis and the precipitated objectionable matter is removed as by filtration. The invention also contemplates the treatment of serum under acid conditions of controlled pH with a soluble salt of an organic acid for the precipitation of objectionable matter. The liquid portion separated from the precipitated solids is made alkaline and a precipitation of pseudo-globulin results. The precipitate containing pseudo-globulin is redissolved in a suitable acid solution thereby producing a clear, concentrated serum containing a relatively high yield of anti-virus.

In carrying out the method of the invention a suitable quantity of blood is obtained from one or more animals hyper-immunized with one of the viruses hereinbefore mentioned. The blood thus obtained is treated by means known in the art as, for example, by centrifuging, for the removal of serum therefrom. This serum may be subjected to a preserving treatment as desired by the addition of any suitable preserving medium known in the art. It is not necessary to preserve the serum at this stage of the operation and in proceeding with the treatment either the preserved or the non-preserved serum, as the case may be, is subjected to dialysis or to electrolysis for the separation of soluble salts or ionized matter. In dialyzing the serum, it is preferably placed in a protein impregnated membranous bag (hereinafter described) which is suspended in pure running water for from three to six days to remove the major portion of soluble material separable at this stage of the operation. In the electrolytic separation of salts or ionized material it is also desirable to use a protein impregnated membrane.

The serum separated from the soluble salts, etc. may be treated with any suitable preservative if desired. The serum, either with or without the added preservative is treated with a suitably concentrated solution of an appropriate salt, for example, a solution containing approximately about 0.15 grams of sodium chloride per liter, or a sufficient amount of salt to make a 1/30 to 1/40 normal solution thereof. The acidity of the solution is then increased as by adding acetic acid (e. g. a normal solution), to produce a pH of from approximately 4.8 to 5.0. A most advantageous and effective condition of acidity in the serum-containing solution for the purpose of concentration results when the pH thereof is approximately 4.9. At this stage of the treatment the method of concentration may proceed in one of two different ways.

One way or modification in proceeding in accordance with the method of the invention is as follows:

The serum-containing solution acidified to a pH varying from 4.8 to 5.0 and preferably at approximately 4.9 is then sufficiently decreased in temperature, in the neighborhood of 4° C., to precipitate such objectionable matter as inert or acid proteins. After the precipitation has proceeded to a satisfactory degree, the liquid serum is separated from the solid matter by any suitable and known means as, for example, by filtering. The serum may be subjected to an additional filtering step through such material as paper pulp or infusorial earth. At the conclusion of the filtering operation the acidity of the serum is decreased to approximate neutrality and preferably to within the range of approximately 6.8 to 7.0, a most effective pH being about 6.8, by adding a suitable alkali, for example, a normal solution of sodium hydroxide. This decrease in acidity of the serum causes additional objectionable matter to be thrown out of solution. By reason of the various liquid additions made to the original serum during the course of the treatment, the volume will ordinarily have been doubled, thus making the serum-containing solution at this state approximately twice its original volume. If the volume had not been so increased, it is desirable to add water to increase the quantity to twice is original volume prior to proceeding with the next step in the concentration.

The serum is now subjected to the action of a salt of a strong base and a strong acid, for example, sodium chloride, by adding approximately 170 grams of the salt per liter of serum-containing liquid. This addition of a highly ionized salt of a strong base and a strong acid precipitates such objectionable matter as fibrin that has not been thrown out of solution or suspension by the preceding treatment. The serum is allowed to stand for a sufficient period to permit sedimentation and is then filtered through ordinary filter paper. To the filtrate is added an equal volume of an aqueous solution saturated with ammonium sulphate. This addition of ammonium sulphate solution effects a further precipitation, the precipitate containing the serum constituent sought, and the mixture is filtered through either paper or cloth filter. The precipitate from the last filtering operation which contains the active agent is then subjected to a suitable treatment for the separation of soluble salts therefrom, either by electrolysis or by dialysis. When either method is resorted to, a protein impregnated membranous medium is preferably used and the separating process is carried on for such period as is necessary to free the serum substantially of salts. For practical purposes, the dissolved salt is sufficiently removed when the soluble sulphates are reduced to approximately 1/40th of 1%. The anti-virus remaining in the serum at the conclusion of the electrolytic or dialyzing operations for the removal of soluble salts, is in a relatively highly concentrated form, but is not appreciably, if at all, linked to insoluble proteins. The anti-virus in this condition would quite readily pass through the ordinary membrane and the use of a membrane impregnated with protein materials has been found eminently satisfactory for the purposes of dialysis at this stage of the operation because such impregnated membrane very materially diminishes the loss of anti-virus that would otherwise occur.

The other modification or way of proceeding in accordance with the method of the invention is as follows:

The serum-containing solution which had been acidified to a pH varying from 4.8 to 5.0 as previously described is treated with a salt of an organic acid, for example, a salt of a low molecular weight fatty acid such as acetic acid, propionic acid, or butyric acid, etc., the salt being formed of such relatively non-toxic metals as calcium, magnesium, zinc, barium, or aluminum. Zinc acetate has been found to be a most highly effective organic salt for this purpose and it is added to the serum-containing solution in quantities varying from 0.05 to 0.15% thereof. The serum-containing solution is then diluted by adding an equal volume of distilled water. A very rapid precipitation of objectionable matter takes place at low temperatures, e. g. at about 4° C., and the serum-containing solution is thereafter subjected to filtration. The filtrate is made alkaline by any suitable manner as by adding a normal solution of sodium hydroxide. When the pH of the serum-containing solution reaches approximately 7.3, a precipitation of pseudo-globulin takes place and when precipitation has proceeded to sufficient completion, the mass is filtered through either paper or cloth. The precipitate thus obtained is redissolved in a weakly acid solution preferably by adding a sufficient amount of normal acetic acid, to bring all of the pseudo-globulin into solution. This resulting acid solution is a clear and highly concentrated serum.

It is generally necessary to preserve the serum and this may be done by any suitable means now practiced in the art. By way of example, the concentrated serum resulting from either modification of the method of the invention may be preserved for future use as follows:

To the serum is added a solution containing 0.5% phenol, 0.6% sulphuric ether, and about 1% sodium chloride. The serum is then centrifuged or filtered through paper pulp or infusorial earth to remove cloudiness and is thereafter filtered through a stone filter for the purpose of sterilization. After testing for sterility, the serum is ready for bottling. The protein impregnated dialyzing membrane for use in this method is prepared as follows:

A sheet of membranous material such, for example, as "Cellophane" or parchment is formed into a bag having a capacity of approximately five liters. The bag is filled with serum, preferably horse serum, and is suspended in air at room temperature for about forty hours. The protein of the serum enters the membrane and forms what has been hereinbefore referred to as a protein impregnated membrane. The serum is removed and the bag washed with water. The bag may be preserved for future use by keeping it submerged in water containing 2.5% carbolic acid solution.

The combination of steps which contribute to the method of the invention cooperates in the removal of soluble salts and proteins without appreciable loss of anti-virus. By this method it is practicable to produce a clear concentrated serum containing, for example, approximately 16% of the total solids, the volume of which may be reduced to about one-fifth that of the original serum or less. Other notable advantages are attributable to the method of the invention, among which may be mentioned shortening of the period of concentration, decreasing of the cost of production, and in retarding absorption of the serum itself after injection into an animal.

We claim:

1. In a method of concentrating canine distemper serum of virus origin, the steps which comprise separating serum from blood, acidifying the serum to obtain a pH of 5.0 or less, and adding a zinc salt of a low molecular weight fatty acid to the serum-containing solution to effect a precipitation of objectionable matter therefrom.

2. In a method of concentrating canine distemper serum of virus origin, the steps which comprise separating serum from blood, acidifying the serum to obtain a pH of 5.0 or less, and adding zinc acetate to the serum-containing solution to effect a precipitation of objectionable matter therefrom, removing the precipitate and raising the pH of the solution to above 7, thereby precipitating pseudo-globulin, and redissolving the pseudo-globulin, thereby obtaining an anti-virus serum.

3. In a method of concentrating canine distemper serum of virus origin, the steps which comprise adding sodium chloride to the serum, acidifying the serum to obtain a pH varying from approximately 4.8 to 5.0, adding zinc acetate to the serum-containing solution, diluting the solution with water and filtering, raising the pH of the filtrate to above 7.0 to effect a precipitation of pseudo-globulin.

4. In a method of concentrating canine distemper serum of virus origin, the steps which comprise separating serum from blood, adding a suitable water soluble salt of a strong base and a strong acid to the serum, acidifying the serum to obtain a pH of 5.0 or less, and adding approximately 0.15 per cent or less of zinc acetate to the serum-containing solution to effect a precipitation of objectionable matter therefrom.

5. In a method of concentrating canine distemper serum of virus origin, the steps which comprise adding a suitable water soluble salt of a strong base and a strong acid to the serum, acidifying the serum to obtain a pH varying from approximately 4.8 to 5.0, and adding a salt formed of a low molecular weight fatty acid and a metal of the group consisting of calcium, magnesium, barium, zinc and aluminum to the serum-containing solution to effect precipitation.

6. In a method of concentrating canine distemper serum of virus origin, the steps which comprise adding a suitable water soluble salt of a strong base and strong acid to the serum, acidifying the serum to obtain a pH varying from approximately 4.8 to 5.0, and adding zinc acetate to the serum-containing solution to effect precipitation.

7. The method of concentrating canine distemper serum of virus origin which comprises separating serum from blood, treating the serum with a suitable water soluble salt of a strong base and a strong acid, acidifying the serum to produce a pH varying from about 4.8 to 5.0, adding zinc acetate to the serum-containing solution and precipitating objectionable matter therefrom, diluting the solution with about an equal volume of water, precipitating additional objectionable matter therefrom and filtering, increasing the pH of the resulting filtrate to above 7.0 and precipitating pseudo-globulin, separating the pseudo-globulin and redissolving the same in a suitably acid solution.

GEORGE WATSON LITTLE.
ABRAHAM J. KLEIN.